US012592657B2

(12) United States Patent
Taniguchi et al.

(10) Patent No.: US 12,592,657 B2
(45) Date of Patent: Mar. 31, 2026

(54) SYNCHRONOUS MACHINE CONTROL DEVICE, SYNCHRONOUS MACHINE CONTROL METHOD, AND ELECTRIC VEHICLE

(71) Applicant: Hitachi Astemo, Ltd., Hitachinaka (JP)

(72) Inventors: Shun Taniguchi, Tokyo (JP); Kazuaki Tobari, Tokyo (JP); Noriya Nakao, Tokyo (JP); Toshiyuki Ajima, Tokyo (JP); Kenichi Yoshida, Hitachinaka (JP); Kentaro Matsuo, Hitachinaka (JP); Eigo Kishimoto, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 17 days.

(21) Appl. No.: 17/911,785

(22) PCT Filed: Dec. 28, 2020

(86) PCT No.: PCT/JP2020/049083
§ 371 (c)(1),
(2) Date: Sep. 15, 2022

(87) PCT Pub. No.: WO2021/186842
PCT Pub. Date: Sep. 23, 2021

(65) Prior Publication Data
US 2023/0155529 A1      May 18, 2023

(30) Foreign Application Priority Data
Mar. 17, 2020     (JP) ................................. 2020-045956

(51) Int. Cl.
*H02P 27/12* (2006.01)
*B60L 15/20* (2006.01)
(Continued)

(52) U.S. Cl.
CPC ............ *H02P 21/141* (2013.01); *B60L 15/20* (2013.01); *H02P 21/22* (2016.02); *H02P 27/12* (2013.01); *H02P 2207/05* (2013.01)

(58) Field of Classification Search
CPC ........ H02P 21/141; H02P 21/22; H02P 27/12; H02P 2207/05; B60L 15/20
See application file for complete search history.

(56)                References Cited

U.S. PATENT DOCUMENTS 5,481,168 A * 1/1996 Mutoh .................. B60L 15/025
                                                    318/432
5,481,172 A    1/1996 Hirofumi et al.
                    (Continued)

FOREIGN PATENT DOCUMENTS

CN       103973187 A     8/2014
CN       108377116 A     8/2018
                    (Continued)

OTHER PUBLICATIONS

Extended European Search report issued in corresponding EP Application No. 20926041.3, dated Mar. 22, 2024 (8 pages).
                    (Continued)

*Primary Examiner* — Rina I Duda
(74) *Attorney, Agent, or Firm* — Foley & Lardner LLP

(57)                ABSTRACT

There is provided a synchronous machine control device capable of improving the performance of a motor without complicating a control system. The synchronous machine control device controls a power converter (2) that supplies electric power to a synchronous machine (1). The synchronous machine control device includes a first magnetic flux command computation unit (21) that computes a first magnetic flux command value ($\varphi d^*$, $\varphi q^*$) from a current command value (Id*, Iq*) of the synchronous machine (1), a magnetic flux estimation unit (23) that estimates a magnetic flux value ($\varphi dc$, $\varphi qc$) of the synchronous machine (1) from
(Continued)

a current detection value (Idc, Iqc) of the synchronous machine (1), and a voltage computation unit (19) that creates a voltage command value (Vd*, Vq*) of the power converter such that the first magnetic flux command value ($\varphi$d*, $\varphi$q*) coincides with the magnetic flux value ($\varphi$dc, $\varphi$qc).

14 Claims, 8 Drawing Sheets

(51) Int. Cl.
  H02P 21/14       (2016.01)
  H02P 21/22       (2016.01)

(56)                 References Cited

U.S. PATENT DOCUMENTS

| | | | | |
|---|---|---|---|---|
| 6,315,081 | B1 * | 11/2001 | Yeo | B66B 1/285 |
| | | | | 187/293 |
| 6,598,008 | B2 * | 7/2003 | Lee | H02P 21/141 |
| | | | | 702/147 |
| 7,852,039 | B2 * | 12/2010 | Kinpara | H02P 27/06 |
| | | | | 318/807 |
| 7,898,197 | B2 * | 3/2011 | Tomigashi | H02P 21/10 |
| | | | | 318/807 |
| 7,902,790 | B2 * | 3/2011 | Arakawa | H02P 21/08 |
| | | | | 318/807 |
| 8,384,322 | B2 * | 2/2013 | Tomigashi | H02P 27/08 |
| | | | | 318/504 |
| 8,736,206 | B2 * | 5/2014 | Kono | H02P 21/18 |
| | | | | 363/109 |
| 10,587,182 | B2 * | 3/2020 | Kim | F24F 11/88 |
| 2004/0189243 | A1 | 9/2004 | Kazuaki et al. | |
| 2008/0007198 | A1 * | 1/2008 | Kinpara | H02P 21/14 |
| | | | | 318/807 |
| 2008/0191656 | A1 | 8/2008 | Satake et al. | |
| 2011/0204831 | A1 * | 8/2011 | Iwaji | H02P 21/04 |
| | | | | 318/244 |
| 2012/0007528 | A1 | 1/2012 | Junnosuke et al. | |
| 2015/0222215 | A1 * | 8/2015 | Ishida | H02P 21/141 |
| | | | | 318/400.02 |
| 2016/0036364 | A1 * | 2/2016 | Yamazaki | H02P 21/141 |
| | | | | 318/400.02 |
| 2017/0294862 | A1 * | 10/2017 | Takahashi | H02M 1/44 |

FOREIGN PATENT DOCUMENTS

| | | |
|---|---|---|
| CN | 108809183 A | 11/2018 |
| JP | 05-308793 A | 11/1993 |
| JP | 11-089277 A | 3/1999 |
| JP | 2003-348875 A | 12/2003 |
| JP | 2004-297966 A | 10/2004 |
| JP | 2011-050178 A | 3/2011 |
| JP | 2013-223329 A | 10/2013 |
| JP | 2015-192463 A | 11/2015 |
| JP | 2016-100994 A | 5/2016 |
| JP | 2016-149822 A | 8/2016 |
| JP | 6428334 B2 | 11/2018 |
| JP | 2019-062661 A | 4/2019 |
| WO | WO2010/116815 A1 | 10/2010 |
| WO | WO-2018/185877 A1 | 10/2018 |

OTHER PUBLICATIONS

International Search Report with English Translation and Written Opinion in International Application No. PCT/JP2020/049083 mailed Apr. 6, 2021.
Japanese Office Action issued in corresponding JP Application No. 2023-172744, dated Jan. 7, 2025 with English translation (6 pages).
Chinese Office Action issued in corresponding CN Patent Application No. 202080095642.8, dated Jul. 7, 2025 with machine translation (15 Pages).
Chinese Office Action issued in CN Application No. 202080095642.8 dated Jan. 30, 2026 with English Translation (14 Pages).
Indian Hearing Notice issued in IN Application No. 202217052759 dated Nov. 13, 2025, with English translation (3 Pages).

* cited by examiner

SYNCHRONOUS MACHINE CONTROL DEVICE, SYNCHRONOUS MACHINE CONTROL METHOD, AND ELECTRIC VEHICLE

TECHNICAL FIELD

The present invention relates to a synchronous machine control device and a synchronous machine control method for driving a synchronous machine such as a synchronous motor, and an electric vehicle using the same.

BACKGROUND ART

In order to reduce the size of a synchronous motor, high-speed rotation and high magnetic flux density of the motor have been advanced. In particular, in an electric vehicle such as an electric automobile, since the weight of the motor has an influence on the power consumption amount, such a tendency is remarkable.

As a conventional control technique corresponding to high-speed rotation, a control technique disclosed in PTL 1 is known.

In the control technique disclosed in PTL 1, a second current command value is created such that a current detection value for a d-axis current and a q-axis current approaches a first current command value. Then, a voltage command value is created based on the second current command value.

In addition, as a conventional control technique corresponding to high magnetic flux density, control techniques disclosed in PTLs 2 and 3 are known.

In the control technique disclosed in PTL 2, a voltage command value is created based on the second current command value in PTL 1 and based on a coil interlinkage magnetic flux.

In the control technique disclosed in PTL 3, a current control gain is similarly changed in response to a change in an inductance value with respect to a motor current value.

CITATION LIST

Patent Literature

PTL 1: JP 2004-297966 A
PTL 2: International Publication No. 2010/116815
PTL 3: JP 2003-348875 A

SUMMARY OF INVENTION

Technical Problem

When the control technique is applied to achieve both high-speed rotation and high magnetic flux density of the motor, the control system becomes complicated. In particular, the number of constants used for a magnetic flux-related computation increases, and thus parameter identification has difficulty, or the load on a control device increases. For this reason, it is difficult to perform mounting on an application target such as an electric vehicle.

Therefore, the present invention provides a synchronous machine control device and a synchronous machine control method capable of improving performance of a motor without complicating a control system, and an electric vehicle using the same.

Solution to Problem

In order to solve the above problems, according to the present invention, a synchronous machine control device controls a power converter that supplies electric power to a synchronous machine. The synchronous machine control device includes a first magnetic flux command computation unit that computes a first magnetic flux command value from a current command value of the synchronous machine, a magnetic flux estimation unit that estimates a magnetic flux value of the synchronous machine from a current detection value of the synchronous machine, and a voltage computation unit that creates a voltage command value of the power converter such that the first magnetic flux command value coincides with the magnetic flux value.

In order to solve the above problems, according to the present invention, there is provided a synchronous machine control method of controlling a power converter that supplies electric power to a synchronous machine. The synchronous machine control method includes computing a first magnetic flux command value from a current command value of the synchronous machine, estimating a magnetic flux value of the synchronous machine from a current detection value of the synchronous machine, and creating a voltage command value of the power converter such that the first magnetic flux command value coincides with the magnetic flux value.

In order to solve the above problems, according to the present invention, an electric vehicle includes a wheel, a synchronous machine that drives the wheel, a power converter that supplies electric power to the synchronous machine, and a control device that controls the power converter. The control device is the synchronous machine control device according to the present invention.

Advantageous Effects of Invention

According to the present invention, it is possible to accurately control a synchronous machine in consideration of an influence of magnetic saturation of the synchronous machine without complicating a control system.

Objects, configurations, and advantageous effects other than those described above will be clarified by the descriptions of the following embodiments.

BRIEF DESCRIPTION OF DRAWINGS

FIG. 1 is a block diagram illustrating a functional configuration of a synchronous machine control device according to a first embodiment.

FIG. 5 is a block diagram illustrating a functional configuration of a synchronous machine control device according to a second embodiment.

DESCRIPTION OF EMBODIMENTS

Figure 2A:
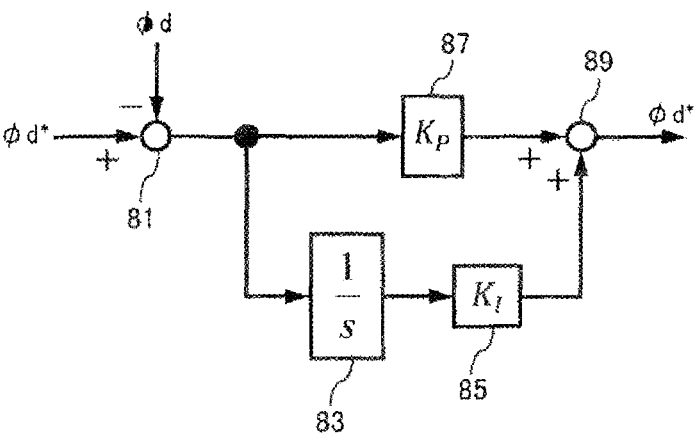
FIG. 2 is a block diagram illustrating a functional configuration of a PI controller in a second dq-axis magnetic flux command computation unit 25.

Hereinafter, an embodiment of the present invention will be described according to first to fourth embodiments below with reference to the drawings. In the drawings, the same reference signs indicate the same configuration requirements or configuration requirements having similar functions.

In the first to fourth embodiments, a synchronous machine being a control target is a permanent magnet synchronous motor (referred to as a "PMSM" (abbreviation of Permanent Magnet Synchronous Motor)).

First Embodiment

Figure 1:
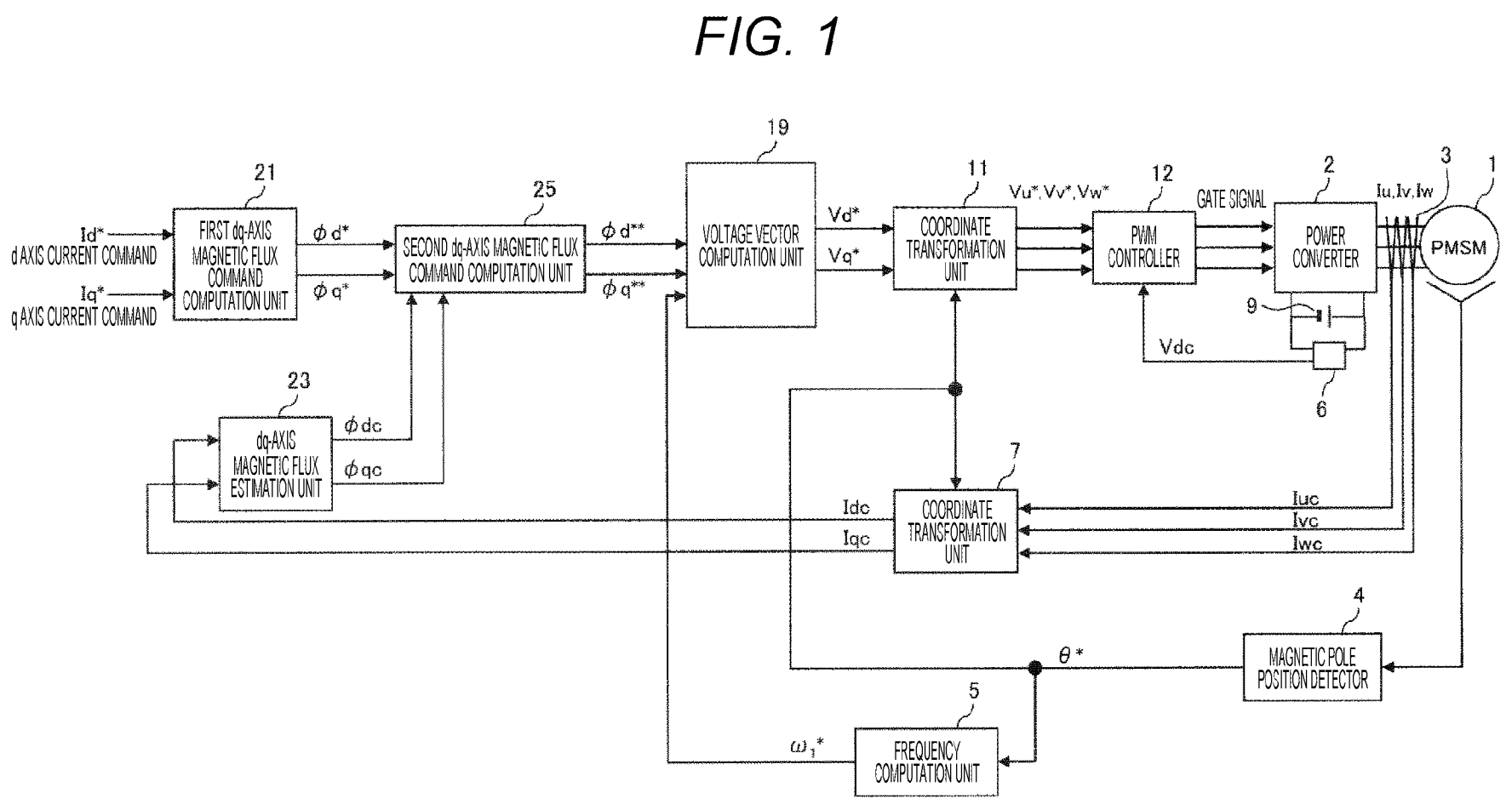

FIG. 1 is a block diagram illustrating a functional configuration of a synchronous machine control device according to a first embodiment. In the present embodiment, a computer system such as a microcomputer executes a predetermined program to function as the synchronous machine control device illustrated in FIG. 1 (the same applies to other embodiments).

In FIG. 1, a power converter 2 converts DC power from a DC voltage source 9 (for example, a battery) into AC power and outputs the AC power to a PMSM 1. The PMSM 1 is rotationally driven by the AC power. The power converter 2 includes an inverter main circuit including a semiconductor switching element. The semiconductor switching element is controlled to be turned on or off by a gate signal, thereby the DC power is converted into the AC power. As the semiconductor switching element, for example, an insulated gate bipolar transistor (IGBT) is applied.

A phase current detector 3 detects a three-phase motor current flowing from the power converter 2 into the PMSM 1, that is, a U-phase current Iu, a V-phase current Iv, and a W-phase current Iw. Then, the phase current detector 3 outputs the U-phase current Iu, the V-phase current Iv, and the W-phase current Iw as a U-phase current detection value Iuc, a V-phase current detection value Ivc, and a W-phase current detection value Iwc, respectively. As the phase current detector 3, a Hall current transformer (CT) or the like is applied.

A magnetic pole position detector 4 detects the magnetic pole position of the PMSM 1 and outputs magnetic pole position information $\theta^*$. A resolver or the like is applied as the magnetic pole position detector 4.

A frequency computation unit 5 computes speed information $\omega^{1*}$ from the magnetic pole position information $\theta^*$ output by the magnetic pole position detector 4, by time differentiation computation or the like, and outputs the speed information $\omega^{1*}$.

A coordinate transformation unit 7 transforms Iuc, Ivc, and Iwc output by the phase current detector into dq-axis current detection values Idc and Iqc in a rotating coordinate system in accordance with the magnetic pole position information $\theta^*$, and outputs Idc and Iqc.

A dq-axis magnetic flux estimation unit 23 estimates dq-axis magnetic flux estimation values $\varphi$dc and $\varphi$qc based on the dq-axis current detection values Idc and Iqc output by the coordinate transformation unit 7, with reference to a lookup table (table data). The lookup table (table data) used as the reference by the dq-axis magnetic flux estimation unit 23 is table data representing the correspondence between Idc and Iqc, and $\varphi$dc and $\varphi$qc. Such a lookup table is stored in a storage device (not illustrated) provided in the synchronous machine control device in the present embodiment. A predetermined function (such as an approximate expression) may be used instead of the lookup table.

A first dq-axis magnetic flux command computation unit 21 computes and outputs first dq-axis magnetic flux command values $\varphi$d* and $\varphi$q* based on dq-axis current command values Idc* and Iqc* given from a higher control device or the like, with reference to a lookup table (table data). The lookup table (table data) used as the reference by the first dq-axis magnetic flux command computation unit 21 is table data representing the correspondence between Idc* and Iqc*, and $\varphi$d* and $\varphi$q*. Such a lookup table is stored in a storage device (not illustrated) provided in the synchronous machine control device in the present embodiment. A predetermined function (such as an approximate expression) may be used instead of the lookup table.

A second dq-axis magnetic flux command computation unit 25 computes second dq-axis magnetic flux command values $\varphi$d and $\varphi$q by a proportional integral (PI) controller such that the first dq-axis magnetic flux command values $\varphi$d* and $\varphi$q* coincide with the dq-axis magnetic flux estimation values $\varphi$dc and $\varphi$qc. Then, the second dq-axis magnetic flux command computation unit 25 outputs the computed second dq-axis magnetic flux command values $\varphi$d and $\varphi$q.

Figure 2B:
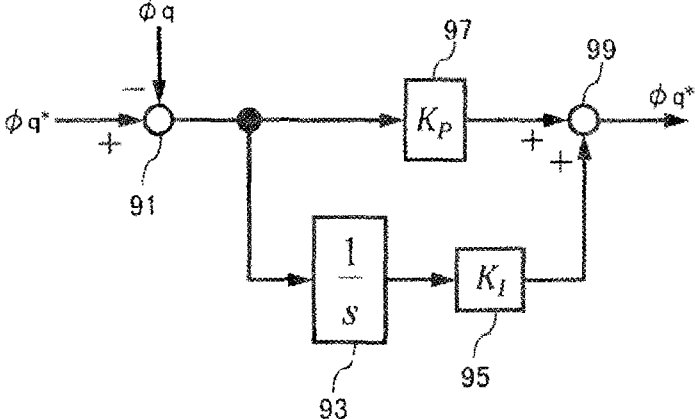

FIG. 2 is a block diagram illustrating a functional configuration of the PI controller in the second dq-axis magnetic flux command computation unit 25.

As illustrated in the upper diagram of FIG. 2, in the PI controller that computes the second d-axis magnetic flux command value $\varphi$d, an adder-subtractor 81** computes a difference ($\varphi$d*−$\varphi$dc) between the first d-axis magnetic flux command value $\varphi$d* and the d-axis magnetic flux estimation value $\rho$dc, and multiplies the difference computation value by a proportional gain 87 ($K^P$). An integrator 83 integrates the difference computation value is integrated, and the integrated value is multiplied by an integral gain 85 ($K^I$). An adder 89 adds the difference computation value multiplied by the proportional gain 87 and the integrated value multiplied by the integral gain 85 to compute the second d-axis magnetic flux command value $\varphi$d**.

As illustrated in the lower diagram of FIG. 2, in the PI controller that computes the second q-axis magnetic flux command value $\varphi$q, an adder-subtractor 91** computes a difference ($\varphi$q*−$\varphi$qc) between the first q-axis magnetic flux command value $\varphi$q* and the q-axis magnetic flux estimation value $\varphi$qc, and multiplies the difference computation value by a proportional gain 97 ($K^P$). An integrator 93 integrates the difference computation value is integrated, and the integrated value is multiplied by an integral gain 95 (KI). An adder 99 adds the difference computation value multiplied by the proportional gain 97 and the integrated value multiplied by the integral gain 95 to compute the second q-axis magnetic flux command value $\varphi$q**.

A voltage vector computation unit 19 illustrated in FIG. 1 creates a voltage command value by an inverse model of a motor model.

The inverse model of the motor model is represented by, for example, a voltage equation as in Expression (1), where a d-axis magnetic flux and a q-axis magnetic flux of a motor are set as $\varphi$d and $\varphi$q, respectively, a d-axis voltage and a q-axis voltage of the motor are set as Vd and Vq, respectively, and the motor speed is set as $\omega^1$.

[Math. 1]

$$\begin{bmatrix} V_d \\ V_q \end{bmatrix} = \begin{bmatrix} \dfrac{R}{L_d} & 0 \\ 0 & \dfrac{R}{L_q} \end{bmatrix} \begin{bmatrix} \phi_d - K_e \\ \phi_q \end{bmatrix} + s\begin{bmatrix} \phi_d \\ \phi_q \end{bmatrix} + \omega_1\begin{bmatrix} 0 & -1 \\ 1 & 0 \end{bmatrix}\begin{bmatrix} \phi_d \\ \phi_q \end{bmatrix} \tag{1}$$

In the present embodiment, the inverse model represented by Expression (1) is applied, where Vd and Vq are respectively set as a d-axis voltage command value Vd* and a q-axis voltage command value Vq*, φd and φq are respectively set as a second d-axis magnetic flux command value φd and a second q-axis magnetic flux command value φq, and ω¹ is set as speed information ω¹*.

As will be described later, in Expression (1), magnetic saturation of the motor is considered.

Figure 3:
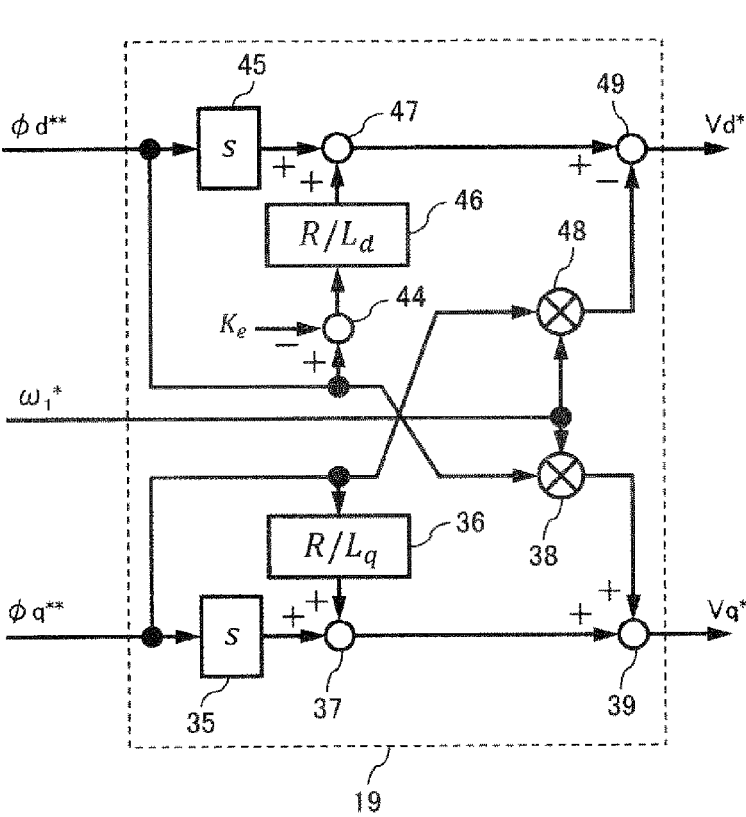
FIG. 3 illustrates a configuration of a voltage vector computation unit 19 configured based on an inverse model represented by Expression (1).

FIG. 3 illustrates a configuration of the voltage vector computation unit 19 configured based on the inverse model represented by Expression (1). R, Ld, Lq, and Ke indicate a winding resistance, a d-axis inductance, a q-axis inductance, and a magnet magnetic flux in the PMSM 1, respectively.

As illustrated in FIG. 3, differentiation of φd is computed by a differentiator 45. In addition, an adder-subtractor 44 computes a difference (φd−Ke) between φd** and Ke. The difference computation value is multiplied by R/Ld (46). An adder 47 adds the differential computation value by the differentiator 45 and the difference computation value multiplied by the gain R/Ld (46). In addition, a multiplier 48 multiplies ω¹* and φq**. Furthermore, the adder-subtractor 49 computes a difference between the addition computation value by the adder 47 and the multiplication value by the multiplier 48 to create Vd*.

As illustrated in FIG. 3, the differentiator 35 computes the differentiation of φq. Further, φq is multiplied by R/Lq (36). The differential computation value by a differentiator 35 and φq** multiplied by R/Lq (36) are added by an adder 37. In addition, ω¹* and φd** are multiplied by a multiplier 38. Furthermore, an adder 39 adds the addition computation value by the adder 37 and the multiplication value by the multiplier 38 to create Vq*.

As described above, the voltage vector computation unit can be configured based on the voltage equation representing the inverse model of the motor model.

The coordinate transformation unit 11 illustrated in FIG. 1 performs coordinate transformation on the dq-axis voltage command values Vd* and Vq* for the power converter 2, which are output from the voltage vector computation unit 19, by using the magnetic pole position information θ* detected by the magnetic pole position detector 4, thereby creating and outputting three-phase voltage command values Vu*, Vv*, and Vw* for the power converter 2.

A DC voltage detector 6 detects the voltage of the DC voltage source 9 and outputs DC voltage information Vdc.

A PWM controller 12 receives the three-phase voltage command values Vu*, Vv*, and Vw* from the voltage vector computation unit 19, and receives the DC voltage information Vdc from the DC voltage detector 6. Then, the PWM controller 12 creates and outputs a gate signal to be given to the power converter 2 based on the received three-phase voltage command values Vu*, Vv*, and Vw* and DC voltage information Vdc, by pulse width modulation. For example, the PWM controller 12 creates a gate signal by pulse width modulation using a triangular wave as a carrier signal and using the three-phase voltage command values as a modulation wave.

Means for creating the voltage command value in consideration of magnetic saturation of the PMSM 1 used in the voltage vector computation unit 19 in the present embodiment will be described below.

First, in a case where currents (dq-axis currents Id and Iq) are used as a state quantity, the voltage equation is represented as Expression (2) in consideration of magnetic saturation.

[Math. 2]

$$\begin{bmatrix} V_d \\ V_q \end{bmatrix} = R\begin{bmatrix} I_d \\ I_q \end{bmatrix} + \begin{bmatrix} L_{dh} & L_{qdh} \\ L_{dqh} & L_{qh} \end{bmatrix}s\begin{bmatrix} I_d \\ I_q \end{bmatrix} + \omega_1\begin{bmatrix} -L_{dq} & -L_q \\ L_d & L_{qd} \end{bmatrix}\begin{bmatrix} I_d \\ I_q \end{bmatrix} + \omega_1\begin{bmatrix} 0 \\ K_e \end{bmatrix} \tag{2}$$

Here, Ldh, Lqh, Ldqh, and Lqdh represent dynamic inductances, and Ld, Lq, Ldq, and Lqd represent static inductances. The above inductances will be described with reference to FIG. 4.

Figure 4:
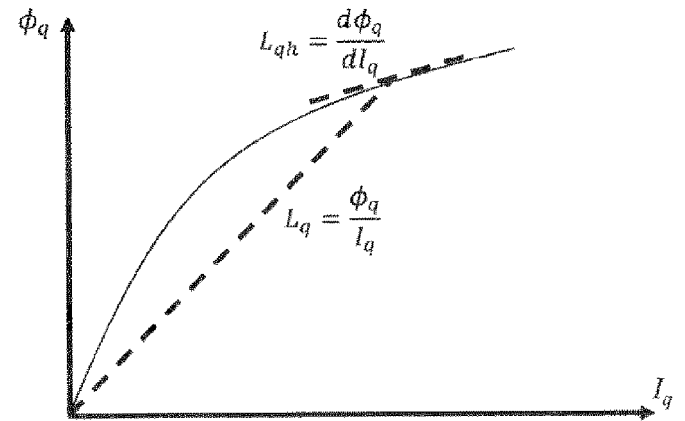
FIG. 4 illustrates an example of a relationship between a magnetic flux and a current.

FIG. 4 illustrates an example of a relationship between the magnetic flux and the current. The vertical axis and the horizontal axis respectively indicate an example of a relationship between the magnetic flux and the current (solid line in the drawing).

As illustrated in FIG. 4, due to the influence of magnetic saturation, as the q-axis current (Iq) increases, the degree of increase in the q-axis magnetic flux (φq) becomes gentler. Therefore, as the inductance, the dynamic inductance and the static inductance are defined as follows. The dynamic inductance Lqh refers to an inclination (dφq/dt) of a tangent line (broken line in the drawing) at a certain operating point (Iq, φq). The static inductance Lq refers to an inclination (φq/Iq) of a straight line (broken line in the drawing) connecting the operating point and a point at which the q-axis current (Iq) is 0.

Although not illustrated, the relationship between the d-axis magnetic flux and the d-axis current, the dynamic inductance Ldh, and the static inductance Ld are similar to those in FIG. 4.

In Expression (2), the coefficient (matrix) in the current derivative term (second term on the right side) is the dynamic inductance, and the coefficient (matrix) in the induced voltage term (third term on the right side) is the static inductance.

In addition, in a case where magnetic saturation is remarkable, mutual interference between control axes, that is, between dq axes occurs. Such mutual interference is represented by the dynamic inductances Ldqh and Lqdh in the coefficient (matrix) of the current derivative term and the static inductances Ldq and Lqd in the coefficient (matrix) of the induced voltage term.

In a case where the PMSM 1 is controlled based on Expression (2), that is, in consideration of magnetic saturation using the current as the state quantity, eight types of inductances (Ldh, Lqh, Ldqh, Lqdh, Ld, Lq, Ldq, and Lqd) as described above are used. Thus, in this case, the synchronous machine control device includes eight pieces of table data or functions (such as an approximate expression) representing the correspondence between each inductance value and the current value (d-axis current value and q-axis current value).

Considering the temperature dependency of the inductances, each piece of the table data or each mathematical expression (such as an approximate expression) is table data or a function of three variables by using the d-axis current value, the q-axis current value, and the temperature as variables.

Furthermore, since the magnet magnetic flux Ke in Expression (2) has dependency on the q-axis current Iq and the temperature T, the synchronous machine control device includes one piece of table data or function (such as an approximate expression) of two variables representing the relationship between the two variables and Ke by using Iq and T as variables.

As described above, in a case where the PMSM 1 is controlled in consideration of magnetic saturation by using the current as the state quantity, the synchronous machine control device includes a plurality of pieces of multivariable table data or multivariable functions.

Therefore, as described below, in the present embodiment, by using the magnetic flux as the state quantity as in the inverse model of the motor model represented by Expression (1) described above, the total number (nine in a case of using the current as the state quantity as described above) of pieces of table data or functions (such as an approximate expression) used in the synchronous machine control device is reduced even while considering magnetic saturation.

In a case where the magnetic flux (dq-axis magnetic flux φd, φq) are used as the state quantity, the voltage equation is represented as Expression (3) in consideration of magnetic saturation.

[Math. 3]

$$\begin{bmatrix} V_d \\ V_q \end{bmatrix} = \tag{3}$$

$$\frac{R}{L_d L_q - L_{dq} L_{qd}} \begin{bmatrix} L_q & -L_{qd} \\ -L_{dq} & L_d \end{bmatrix} \begin{bmatrix} \phi_d - K_e \\ \phi_q \end{bmatrix} + s \begin{bmatrix} \phi_d \\ \phi_q \end{bmatrix} + \omega_1 \begin{bmatrix} 0 & -1 \\ 1 & 0 \end{bmatrix} \begin{bmatrix} \phi_d \\ \phi_q \end{bmatrix}$$

In many high-efficiency PMSMs, for example, for automobiles, the winding resistance R is sufficiently small. Thus, the influence of the first term of Expression (3) in motor control is relatively small. Therefore, even though Ld, Lq, and Ke are set as constant values by approximation as in Expression (1), the influence on the motor control is small. Therefore, the voltage vector computation unit 19 according to the present embodiment sets Ld, Lq, and Ke in Expression (1) as constant values based on Expression (1) described above in which the magnetic flux is set as the state quantity. Then, the voltage vector computation unit 19 creates the dq-axis voltage command values (Vd* and Vq*) in accordance with the dq-axis magnetic flux command values (φd and φq).

In this case, the synchronous machine controller device includes table data or a function (such as an approximate expression) indicating the correspondence relationship between each of the d-axis magnetic flux (φd) and the q-axis magnetic flux (φq), and the current (d-axis current Id, q-axis current Iq). Therefore, the synchronous machine control device includes a total of two pieces of table data or functions.

As described above, by setting the magnetic flux as the state quantity, the number of pieces of table data or functions used for motor control is reduced. As a result, since the control system is simplified while considering magnetic saturation, it is possible to reduce the computation load of the synchronous machine control device and to shorten the parameter identification time.

In the present embodiment, the dq-axis voltage command values Vd* and Vq* are created based on the second dq-axis magnetic flux command values φd and φq created by the second dq-axis magnetic flux command computation unit 25, by using the inverse model of the motor model. Therefore, even in a high-speed region, it is possible to cause the d-axis magnetic flux estimation value φdc and the q-axis magnetic flux estimation value φqc to accurately coincide with the second d-axis magnetic flux command value φd and the second q-axis magnetic flux command value φq, respectively. Thus, according to the synchronous machine control device in the present embodiment, it is possible to control the high-speed rotation of the PMSM 1.

In the present embodiment, the influence of the temperature dependency of the magnetic flux is alleviated by the PI controller or an I controller provided in the second dq-axis magnetic flux command computation unit 25. Therefore, the table data or the function used for the computation of the magnetic flux (φd, φq) may be table data or a function (such as an approximate expression) in which the temperature is not included as a variable and only the current is used as a variable. As a result, it is possible to reduce the computation load of the synchronous machine control device and to shorten the parameter identification time.

In addition, because the same table data or function are used by the first dq-axis magnetic flux command computation unit 21 and the dq-axis magnetic flux estimation unit 23, Idc and Iqc are controlled to coincide with Id* and Iq*, respectively, through the magnetic flux. In this case, a current control system is substantially configured.

In addition, since each of the first dq-axis magnetic flux command computation unit 21 and the dq-axis magnetic flux estimation unit 23 uses independent table data or function, it is possible to perform control in consideration of mutual interference between the axes. In this case, each of the first dq-axis magnetic flux command computation unit 21 and the dq-axis magnetic flux estimation unit 23 uses table data or a function representing the correspondence relationship between the dq-axis magnetic flux command value (φd*, φq*) and the dq-axis current command value (Id*, Iq*), and uses table data or a function representing the correspondence relationship between the dq-axis magnetic flux estimation value (φdc, φqc) and the dq-axis current detection value (Idc, Iqc).

Since the synchronous machine control device in the present embodiment substantially considers the dynamic inductance and the static inductance of the motor, the synchronous machine control device is suitable for application to an electric vehicle such as an electric automobile in which a PMSM having a large influence of magnetic saturation is used and an accurate torque response is required.

The above-described lookup table, table data, and function (approximate expression), which are information indicating the correspondence relationship between the magnetic flux and the current in the PMSM 1, can be set based on actual measurement, magnetic field analysis, or the like.

Second Embodiment

Figure 5:
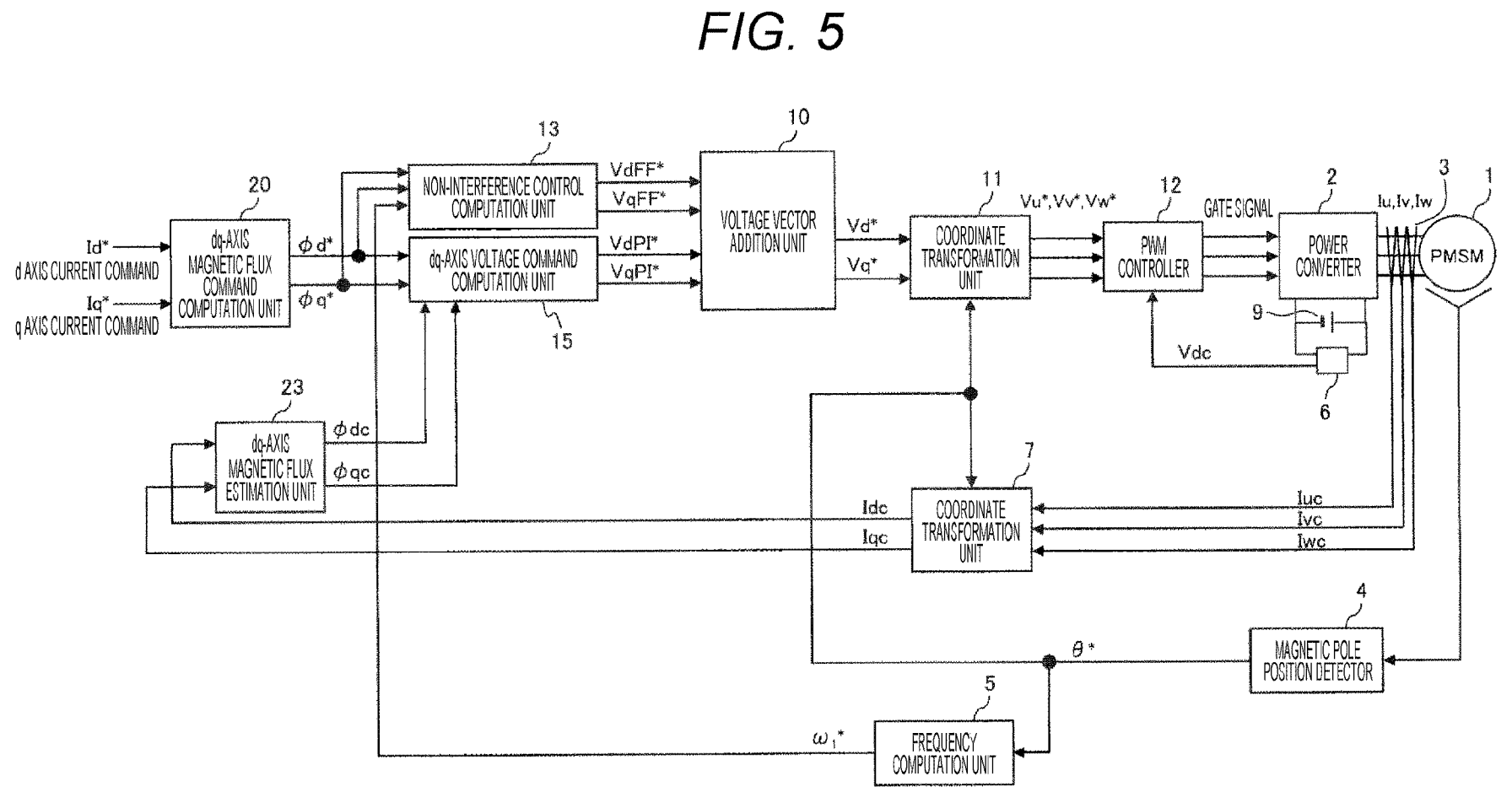

FIG. 5 is a block diagram illustrating a functional configuration of a synchronous machine control device according to a second embodiment of the present invention.

Differences from the first embodiment will be mainly described below.

A dq-axis magnetic flux command computation unit 20 has the similar function to the first dq-axis magnetic flux command computation unit 21 (FIG. 1) described above. That is, the dq-axis magnetic flux command computation unit 20 computes and outputs the dq-axis magnetic flux command values φd* and φq* based on the dq-axis current command values Id* and Iq* given from a higher control device or the like, by using table data or a function (such as an approximate expression), as in the first embodiment.

A dq-axis voltage command computation unit 15 computes and outputs a d-axis voltage provisional command value VdPI* by a controller such as a proportional integral (PI) machine such that the d-axis magnetic flux command value $\varphi d^*$ coincides with the d-axis magnetic flux estimation value $\varphi dc$. In addition, the dq-axis voltage command computation unit 15 computes and outputs a d-axis voltage provisional command value VqPI* by a controller such as a proportional integral (PI) machine such that the q-axis magnetic flux command value $\varphi q^*$ coincides with the q-axis magnetic flux estimation value $\varphi qc$.

A non-interference control computation unit 13 creates and outputs dq-axis voltage command values VdFF* and VqFF* for inter-axis non-interference control, based on the dq-axis voltage command values $\varphi d^*$ and $\varphi q^*$ and the speed information $\omega^1*$.

Figure 6:
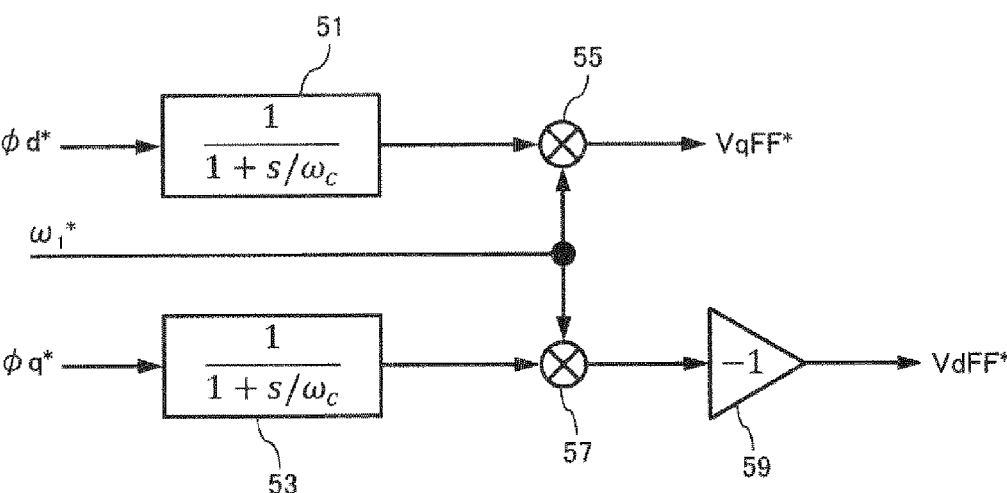
FIG. 6 is a block diagram illustrating an example of a functional configuration of a non-interference control computation unit 13.

FIG. 6 is a block diagram illustrating an example of a functional configuration of the non-interference control computation unit 13.

As illustrated in FIG. 6, $\varphi d^*$ is input to a primary delay computing machine 51 in which the reciprocal of the cutoff frequency $\omega c$ of the current control system is set as a time constant. A multiplier 55 multiplies the output of the primary delay computing machine 51, that is, the result obtained by performing the primary delay computation on $\varphi d^*$ by $\omega^1*$, and thus the d-axis voltage command value VdFF* for the inter-axis non-interference control is created.

As illustrated in FIG. 6, $\varphi q^*$ is input to a primary delay computing machine 53 similar to the primary delay computing machine 51. A multiplier 57 multiplies the output of the primary delay computing machine 53, that is, the result obtained by performing the primary delay computation on $\varphi q^*$ by $\omega^1*$. The positive sign and the negative sign of the output of the multiplier 57 are inverted by an inverter 59 (or gain "−1"), and thus the q-axis voltage command value VqFF* for inter-axis non-interference control is created.

In FIG. 5, a voltage vector addition unit 10 creates a d-axis voltage command value Vd* by adding VdPI* and VdFF*, and outputs the d-axis voltage command value Vd*. The voltage vector addition unit 10 adds VqPI* and VqFF* and outputs a q-axis voltage command value Vq*.

In the second embodiment, the dq-axis magnetic flux command values used for computation of the induced voltage term (third term on the right side of Expressions (1) and (3)) corresponds to the result obtained by performing the primary delay computation on the first dq-axis magnetic flux command values ($\varphi d^*$ and $\varphi q^*$ illustrated in FIG. 1) in the first embodiment. Therefore, according to the synchronous machine control device in the second embodiment, similar to the first embodiment, the dynamic inductance and the static inductance are considered, and the influence of the mutual interference between the axes is suppressed. Thus, it is possible to control the PMSM in which the magnetic flux saturation occurs, with high accuracy.

Third Embodiment

Figure 7:
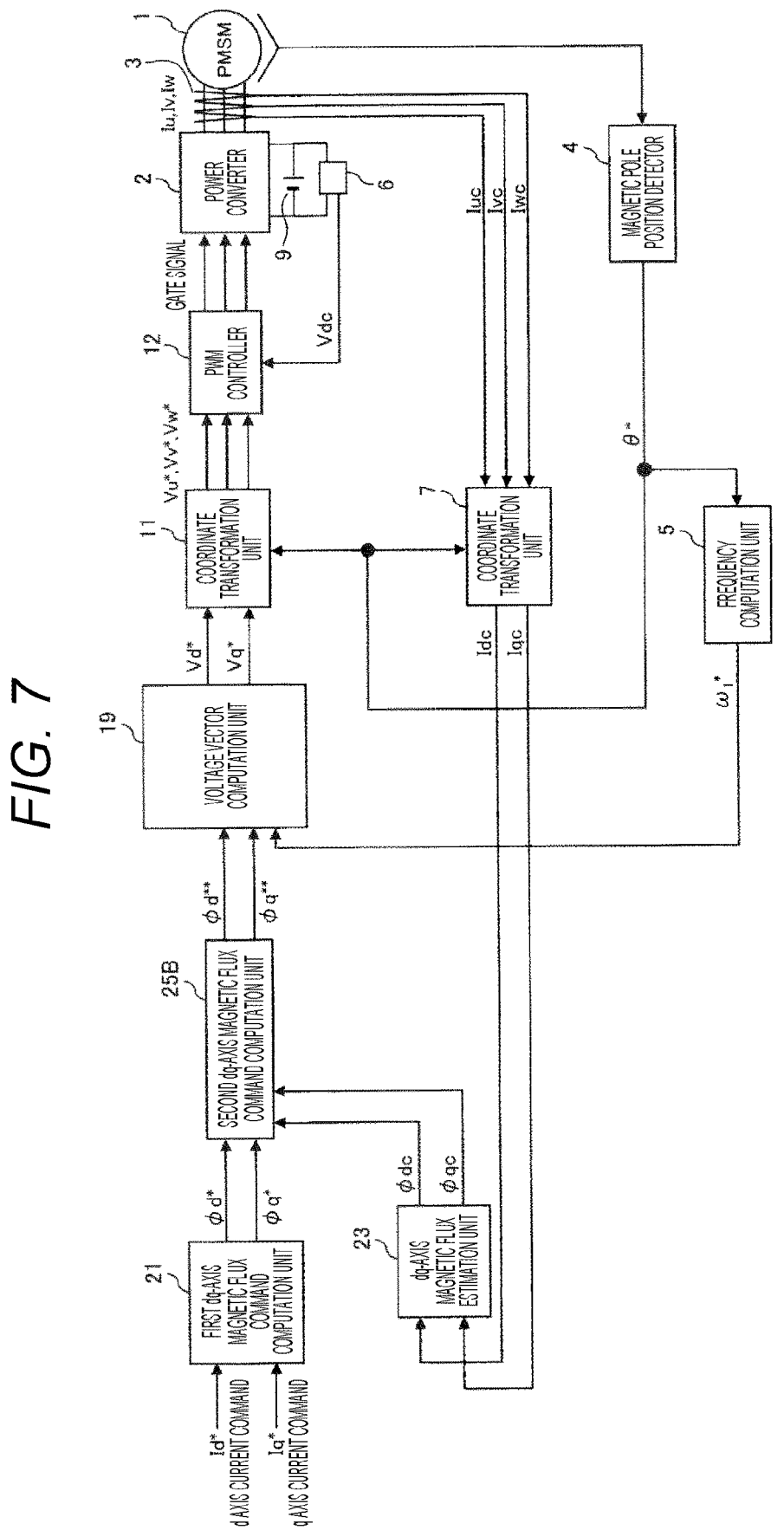
FIG. 7 is a block diagram illustrating a functional configuration of a synchronous machine control device according to a third embodiment.

FIG. 7 is a block diagram illustrating a functional configuration of a synchronous machine control device according to a third embodiment of the present invention.

Differences from the first embodiment will be mainly described below.

In the present embodiment, the configuration of a second dq-axis magnetic flux command computation unit 25B illustrated in FIG. 7 is different from that in the first embodiment (FIG. 2) and includes a primary delay computing machine. Other components are similar to those in the first embodiment (FIG. 1).

Figures 8A, 8B:
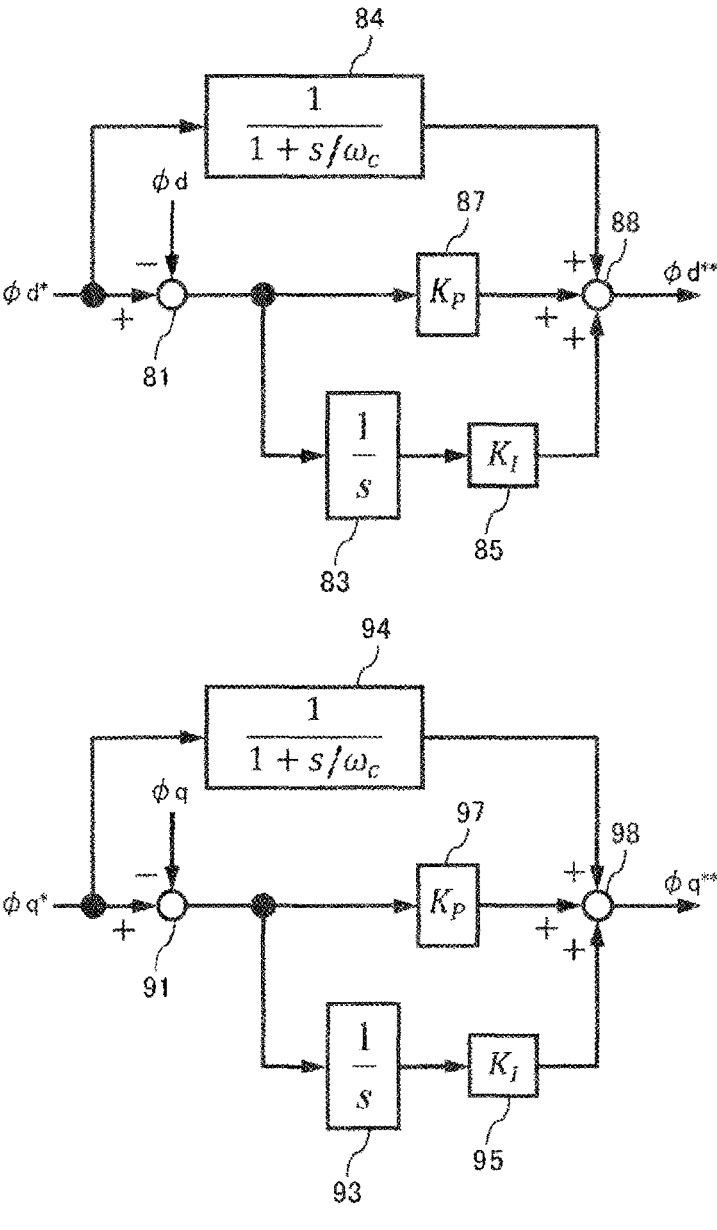
FIG. 8 is a block diagram illustrating an example of a functional configuration of a second dq-axis magnetic flux command computation unit 25B.

FIG. 8 is a block diagram illustrating an example of a functional configuration of the second dq-axis magnetic flux command computation unit 25B.

As illustrated in FIG. 8, in the second dq-axis magnetic flux command computation unit 25B, primary delay computing machines (84 and 94) in which the reciprocal of the cutoff frequency $\omega c$ of the current control system is set as a time constant are added to the proportional integral (PI) controller illustrated in FIG. 2.

The first dq magnetic flux command value ($\varphi d^*$, $\varphi q^*$) is input to the primary delay computing machine (84, 94). An adder (88, 98) adds, to the output of a primary delay computing machine 51, that is, the result obtained by performing the primary delay computation on $\varphi d^*$ and $\varphi q^*$, the difference computation value obtained by multiplying the proportional gain (87, 97) and the integrated value obtained by multiplying the integral gain (85, 95) described above. In this manner, the second dq-axis magnetic flux command value ($\varphi d^{}$, $\varphi d^{}$) is created.

The synchronous machine control device according to the third embodiment includes a magnetic flux feedforward control system by a primary delay controller, in addition to a magnetic flux feedback control system by a differential integration controller. This improves control responsiveness.

Fourth Embodiment

Figure 9:
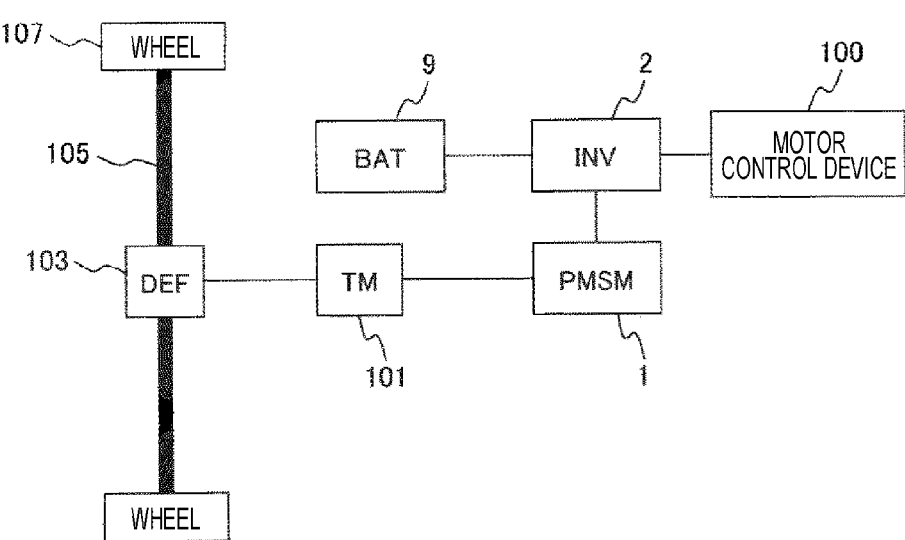
FIG. 9 is a block diagram illustrating a configuration of an electric vehicle according to a fourth embodiment.

FIG. 9 is a block diagram illustrating a configuration of an electric vehicle according to a fourth embodiment of the present invention. An electric vehicle in the present embodiment is an electric automobile.

A motor control device 100 controls AC power supplied from the power converter 2 (inverter) to the PMSM 1. The DC voltage source 9 (for example, a battery) supplies DC power to the power converter 2 (inverter). The power converter 2 (inverter) is controlled by the motor control device 100 to convert DC power from the DC voltage source 9 into AC power. As the motor control device 100, any one of the synchronous machine control devices in the first to third embodiments described above is applied.

The PMSM 1 is mechanically connected to a transmission 101. The transmission 101 is mechanically connected to a drive shaft 105 via a differential gear 103 and supplies mechanical power to a wheel 107. As a result, the wheel 107 is rotationally driven.

The PMSM 1 may be directly connected to the differential gear 103 without the transmission 101. Each of the front and rear wheels of the automobile may be driven by an independent PMSM and inverter.

According to the fourth embodiment, the synchronous machine control device according to any one of the first to third embodiments described above is applied as the motor control device 100. Thus, it is possible to control the PMSM having a large influence of magnetic saturation, with high accuracy. Therefore, the accuracy of the driving control of the electric automobile driven by the PMSM is improved. Thus, the ride comfort for the passenger of the electric automobile is improved.

According to the fourth embodiment, it is possible to reduce the computation load of the motor control device and to shorten the parameter identification time. Therefore, it is possible to realize a motor control device that has high accuracy and high responsiveness and can be mounted on an automobile under the restriction on the size and cost of the device mounted on the automobile.

The synchronous machine control device according to the first to third embodiments described above can be applied not only to an electric automobile but also to an electric vehicle such as an electric railway vehicle. Since the above electric vehicles are moving objects, the size of the motor is reduced. Therefore, the influence of magnetic flux saturation is large. In addition, high responsive control of torque is required for vibration suppression control or idling control. Therefore, the synchronous machine control device according to the first to third embodiments of the present invention is suitable as the motor control device applied to an electric vehicle.

The present invention is not limited to the above-described embodiment, and various modification examples may be provided. For example, the above-described embodiment is described in detail in order to explain the present invention in an easy-to-understand manner, and the above embodiment is not necessarily limited to a case including all the described configurations. Regarding some components in the embodiments, other components can be added, deleted, and replaced.

For example, the synchronous machine being the control target is not limited to the PMSM, and may be a synchronous reluctance motor, a permanent magnet synchronous generator, a wound field synchronous motor, a wound field synchronous generator, or the like.

In addition, the PMSM may be either an embedded magnet type or a surface magnet type, or may be either an outer rotation type or an inner rotation type.

The semiconductor switching element constituting the inverter main circuit is not limited to the IGBT, and may be a metal oxide semiconductor field effect transistor (MOSFET) or the like.

In addition, the synchronous machine control device according to each of the above embodiments can be applied as a control device in various synchronous machine drive systems including a synchronous machine, a power converter that drives the synchronous machine, and the control device that controls the power converter.

REFERENCE SIGNS LIST

1 PMSM
2 power converter
3 phase current detector
4 magnetic pole position detector
5 frequency computation unit
6 DC voltage detector
7 coordinate transformation unit
10 voltage vector addition unit
11 coordinate transformation unit
13 non-interference control computation unit
15 dq-axis voltage command computation unit
19 voltage vector computation unit
20 dq-axis magnetic flux command computation unit
21 first dq-axis magnetic flux command computation unit
23 dq-axis magnetic flux estimation unit
25 second dq-axis magnetic flux command computation unit
25B second dq-axis magnetic flux command computation unit
35 differentiator
37 adder
38 multiplier
39 adder 44 adder-subtractor
45 differentiator
47 adder
48 multiplier
49 adder-subtractor
51 primary delay computing machine
53 primary delay computing machine
55 multiplier
57 multiplier
81 adder-subtractor
83 integrator
84 primary delay computing machine
85 integral gain
87 proportional gain
88 adder
89 adder
91 adder-subtractor
93 integrator
94 primary delay computing machine
95 integral gain
97 proportional gain
98 adder
99 adder
100 motor control device
101 transmission
103 differential gear
105 drive shaft
107 wheel

The invention claimed is:

1. A synchronous machine control device that controls a power converter that supplies electric power to a synchronous machine, the synchronous machine control device comprising:

a first magnetic flux command computation unit that computes a first magnetic flux command value in a rotating coordinate system from a current command value in the rotating coordinate system;

a magnetic flux estimation unit that estimates a magnetic flux value of the synchronous machine in the rotating coordinate system from a current detection value of the synchronous machine in the rotating coordinate system; and a voltage computation unit that creates a voltage command value of the power converter such that the first magnetic flux command value coincides with the magnetic flux value, wherein:

the first magnetic flux command value in the rotating coordinate system includes a first d-axis magnetic flux command value and a first q-axis magnetic flux command value, the current command value in the rotating coordinate system includes a d-axis current command value and a q-axis current command value, the magnetic flux value of the synchronous machine in the rotating coordinate system includes a d-axis magnetic flux value and a q-axis magnetic flux value, the current detection value of the synchronous machine in the rotating coordinate system includes a d-axis current detection value and a q-axis current detection value, and the voltage computation unit that creates a voltage command value of the power converter such that the first d-axis magnetic flux command value coincides with the d-axis magnetic flux value and the first q-axis magnetic flux command value coincides with the q-axis magnetic flux value.

2. The synchronous machine control device according to claim 1, wherein the first magnetic flux command computation unit computes the first magnetic flux command value with reference to a lookup table indicating a correspondence relationship between the current command value and the first magnetic flux command value, and the magnetic flux estimation unit estimates the magnetic flux value with reference to lookup table data of the lookup table indicating a correspondence relationship between the current detection value and the magnetic flux value.

3. The synchronous machine control device according to claim 2, wherein the lookup table data indicating the correspondence relationship between the current command value and the first magnetic flux command value is same as the lookup table indicating the correspondence relationship between the current detection value and the magnetic flux value.

4. The synchronous machine control device according to claim 1, further comprising:

a second magnetic flux command computation unit that computes a second magnetic flux command value such that the first magnetic flux command value coincides with the magnetic flux value, wherein the voltage computation unit creates the voltage command value based on the second magnetic flux command value and a speed of the synchronous machine.

5. The synchronous machine control device according to claim 4, wherein the second magnetic flux command computation unit computes the second magnetic flux command value by using a proportional controller and an integral controller inputting a difference between the first magnetic flux command value and the magnetic flux value.

6. The synchronous machine control device according to claim 4, wherein the voltage computation unit computes the second magnetic flux command value by using a proportional controller, an integral controller, and a primary delay controller constituting a feedforward control system.

7. The synchronous machine control device according to claim 6, wherein the primary delay controller sets a reciprocal of a cutoff frequency in a current control system as a time constant.

8. The synchronous machine control device according to claim 4, wherein the voltage computation unit is configured by an inverse model of the synchronous machine comprising:

a d-axis differentiator computing a d-axis differential computation value with differentiating a d-axis magnetic flux command value in the second magnetic flux command value;

a first d-axis adder-subtractor computing a d-axis difference computation value with subtracting a magnet magnetic flux in the synchronous machine from the d-axis magnetic flux command value;

a d-axis adder adding the d-axis differential computation value and the d-axis difference computation value multiplied by a d-axis gain;

a d-axis multiplier multiplying a q-axis magnetic flux command value in the second magnetic flux command value and a speed of the synchronous machine;

a second d-axis adder-subtractor computing a d-axis voltage command value with subtracting an output of the d-axis multiplier from an output of the d-axis adder;

a q-axis differentiator computing a q-axis differential computation value with differentiating the q-axis magnetic flux command value in the second magnetic flux command value;

a first q-axis adder adding the q-axis differential computation value and the q-axis magnetic flux command value multiplied by a q-axis gain;

a q-axis multiplier multiplying the d-axis magnetic flux command value and the speed of the synchronous machine; and a second q-axis adder computing a q-axis voltage command value with adding an output of the first q-axis adder and an output of the q-axis multiplier.

9. The synchronous machine control device according to claim 1, further comprising:

a first voltage command computation unit that creates a first voltage command value such that the first magnetic flux command value coincides with the magnetic flux value; and a second voltage command computation unit that creates a second voltage command value for non-interference control, based on the first magnetic flux command value and a speed of the synchronous machine, wherein the voltage computation unit creates the voltage command value of the power converter based on the first voltage command value and the second voltage command value.

10. The synchronous machine control device according to claim 9, wherein the second voltage command computation unit creates the second voltage command value by using a primary delay controller.

11. The synchronous machine control device according to claim 10, wherein the primary delay controller sets a reciprocal of a cutoff frequency in a current control system as a time constant.

12. An electric vehicle comprising:

a wheel;

a synchronous machine that drives the wheel;

a power converter that supplies electric power to the synchronous machine; and a control device that controls the power converter, wherein the control device is the synchronous machine control device described in claim 1.

13. The synchronous machine control device according to claim 1, further comprising:

a second magnetic flux command computation unit that computes a second magnetic flux command value such that the first magnetic flux command value coincides with the magnetic flux value, wherein:

the voltage computation unit creates the voltage command value with an inverse model of the synchronous machine represented by a voltage equation, the voltage equation represents a voltage of the synchronous machine in the rotating coordinate system by a magnetic flux of the synchronous machine in the rotating coordinate system, and the voltage command value and the second magnetic flux command value are set as the voltage and the magnetic flux in the voltage equation, respectively.

14. A synchronous machine control method for controlling a power converter that supplies electric power to a synchronous machine, the synchronous machine control method comprising:

computing a first magnetic flux command value in a rotating coordinate system from a current command value in the rotating coordinate system;

estimating a magnetic flux value of the synchronous machine in the rotating coordinate system from a current detection value of the synchronous machine in the rotating coordinate system; and creating a voltage command value of the power converter such that the first magnetic flux command value coincides with the magnetic flux value, wherein:

the first magnetic flux command value in the rotating coordinate system includes a first d-axis magnetic flux command value and a first q-axis magnetic flux command value, the current command value in the rotating coordinate system includes a d-axis current command value and a q-axis current command value, the magnetic flux value of the synchronous machine in the rotating coordinate system includes a d-axis magnetic flux value and a q-axis magnetic flux value, the current detection value of the synchronous machine in the rotating coordinate system includes a d-axis current detection value and a q-axis current detection value, and creating a voltage command value of the power converter such that the first d-axis magnetic flux command value coincides with the d-axis magnetic flux value and the first q-axis magnetic flux command value coincides with the q-axis magnetic flux value.

* * * * *